May 28, 1968   H. JACOBY   3,385,145
MACHINE TOOL
Filed Jan. 5, 1966
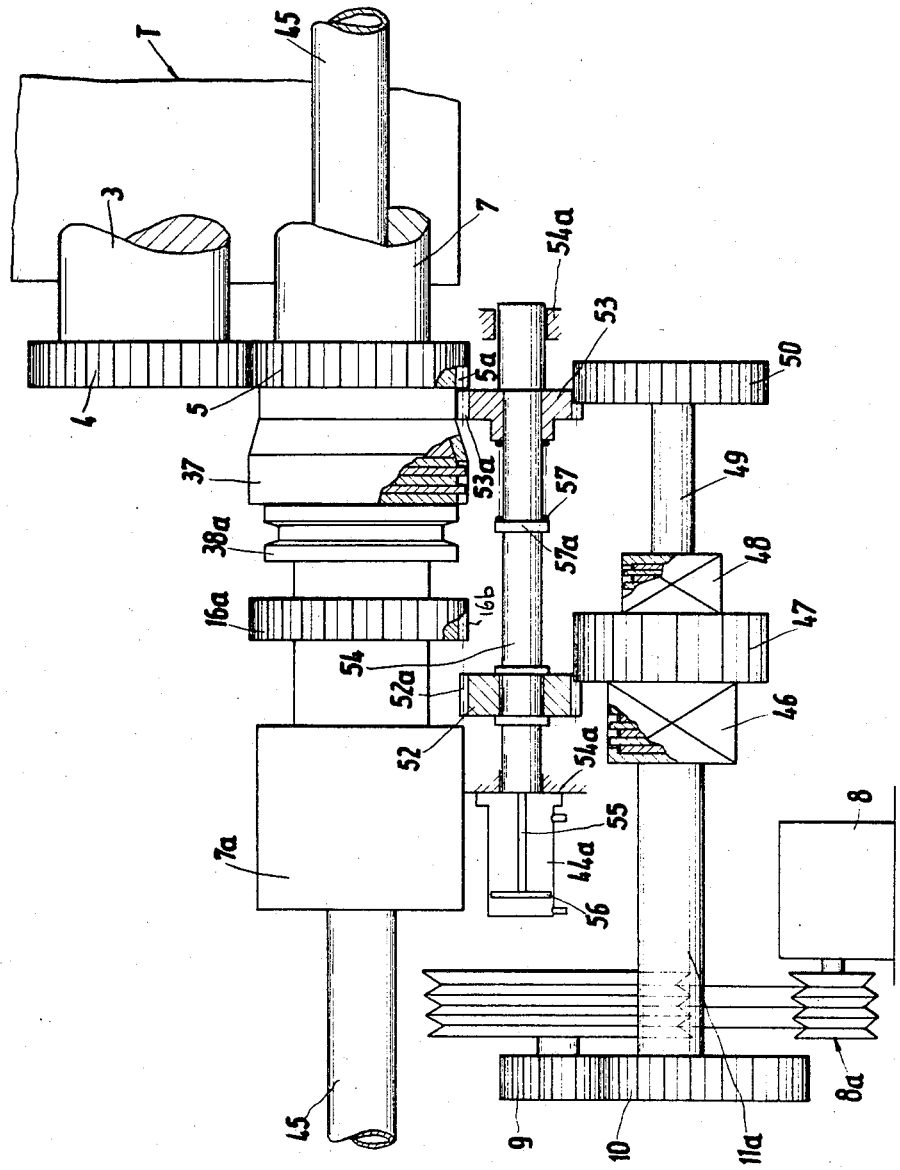
Inventor:
Hans Jacoby
by Michael J. Striker
Atty

United States Patent Office 3,385,145
Patented May 28, 1968

3,385,145
MACHINE TOOL
Hans Jacoby, Bielefeld, Germany, assignor to Werkzeugmaschinenfabrik Gildemeister and Co. Akt.-Ges., Am Hauptbahnhof, Bielefeld, Germany
Filed Jan. 5, 1966, Ser. No. 519,174
9 Claims. (Cl. 82—29)

ABSTRACT OF THE DISCLOSURE

A multiple-spindle machine tool wherein the spindles can be disconnected from the main drive and can be driven seriatim by an auxiliary drive which is outwardly adjacent to the circle described by the rear ends of spindles and can rotate one spindle at a time during intervals between indexing movements of the spindle carrier.

---

The present invention relates to machine tools in general, and more particularly to improvements in automatic or semiautomatic multiple-spindle machines of the type disclosed in my copending application Ser. No. 384,196, filed on July 21, 1964, now Patent No. 3,292,466. Still more particularly, the invention relates to an improved driving unit for use in multiple-spindle bar machines or the like.

My aforementioned copending application Ser. No. 384,196 discloses a driving arrangement which can rotate each work spindle at a plurality of speeds. The work spindles are mounted in and can rotate with reference to an indexible carrier. A main or primary driving unit comprises meshing gears provided on the main shaft which supports the carrier and on the individual work spindles whereby the gears of the spindles constitute planet pinions and the gear on the mainshaft constitues the sun wheel of a planetary transmission. A secondary or auxiliary driving unit comprises an ouput shaft which is coaxial with a work spindle during each interval between consecutive indexing movements of the carrier and which can be coupled to the momentarily aligned work spindle to rotate the same at a speed which is different from the speed that can be imparted to such selected work spindle by the planetary transmission. During rotation in response to operation of the secondary driving unit, the selected work spindle is disconnected from the sun wheel so that it may be driven at a speed which exceeds or is less than the basic speed transmitted thereto by the main driving unit. The output shaft of the secondary driving unit is provided at that axial end of the carrier which faces away from the actual working station or stations, i.e., the output shaft can be coupled to the rear end portions of work spindles. Consequently, the secondary driving unit of my copending application Ser. No. 384,196 cannot be used in multiple-spindle bar machines wherein the stock is fed axially through the rear end portion of each work spindle and extends through and beyond the forward end portion of such work spindle to be treated at one or more working stations adjacent to the front end face of the indexible carrier. The same holds true when the multiple-spindle machine is constructed in such a way that the work-holding chucks at the front ends of work spindles are operated by cylinder-and-piston units mounted at the rear ends of the respective work spindles. Such cylinder-and-piston units would prevent coupling of the rear ends of the work spindles to the output shaft of the secondary driving unit.

Accordingly, it is an important object of the present invention to provide a multiple-spindle machine wherein each work spindle may be coupled to a secondary or auxiliary driving unit regardless of whether or not the rear end portion of the work spindle is free and regardless of whether or not the stock extends beyond the rear end portion of such work spindle.

Another object of the invention is to provide a multiple-spindle bar machine or chucking machine wherein both axial ends of each work spindle might be or are unavailable for connection to a secondary driving unit and to construct and install the secondary driving unit in such a way that it can be readily coupled to the work spindles without in any way interfering with or being interfered with by, the parts which occupy or prevent access to the rear end portions of work spindles.

A further object of the invention is to provide a novel system of clutches and a novel synchronizing system for use in a machine tool of the just outlined characteristics.

A concomitant object of the invention is to provide a novel secondary driving unit for the work spindles or a multiple-spindle machine tool.

Still another object of the invention is to provide a secondary driving unit which can be adjusted to drive a selected work spindle at any desired speed.

A further object of the invention is to provide a secondary driving unit which occupies little room and which can be readily installed in existing multiple-spindle chucking, bar and like machines.

Briefly stated, one feature of my present invention resides in the provision of a multiple-spindle machine tool, for example, a bar machine, which comprises a carrier indexible about a fixed axis, an annulus of work spindles rotatably mounted in the carrier and having end portions extending beyond one end of the carrier, and an auxiliary driving unit which is outwardly adjacent to the circle defined by the end portions of the spindles and is arranged to drive a spindle during intervals between successive indexing movements of the carrier. The end portion of each spindle carries a driven gear and the auxiliary driving unit comprises a driver gear which may be rotated by a motor or an analogous prime mover. The driven gears of consecutive spindles may be moved axially into and out of mesh with the driver gear, or vice versa. The teeth of such gears may be provided with pointed end portions which engage each other when the driver gear is caused to mesh with one of the driven gears to thus prevent clashing of teeth and to insure that the transmission of motion between the driver gear and the selected spindle begins and ends smoothly.

The novel features which are considered as characteristic of the invention are set forth in particular in the appended claims. The improved secondary or auxiliary driving unit itself, however, both as to its construction and its mode of operation, together with additional features and advantages thereof, will be best understood upon perusal of the following detailed description of certain specific embodiments with reference to the accompanying drawing the single illustration of which shows a portion of a multiple-spindle bar machine embodying the improved auxiliary driving unit.

Referring to the drawing in detail, there is shown a carrier T which resembles a turret or drum and is indexible about the axis of a main shaft 3. The carrier T supports an annulus of parallel rotary work spindles 7, only one shown. The main or primary driving unit comprises a transmission including a sun gear or wheel 4 or the main shaft 3 and a planet pinion 5 on each work spindle 7. The spindles 7 are hollow so that each thereof may accommodate a portion of a cylindrical bar 45 or similar elongated stock whereby the stock may extend beyond the rear and front end portions of the work spindle. The numeral 7a denotes a chuck for the stock 45. The working station or stations are located at the right-hand end of the carrier T and are not shown in the drawings. Since the work spindles 7 are indexible about the axis of the main shaft 3, and since the stock 45 is fed through the rear ends of the work spindles, such rear ends are not accessible to a secondary or auxiliary driving unit of the type disclosed in my copending application Ser. No. 384,196. In accordance with my present invention, I provide a different secondary or auxiliary driving unit which is mounted outside of the circle defined by the exposed left-hand end portions of the work spindles 7 and which can be coupled to consecutive work spindles during intervals between successive indexing movements of the carrier T. This secondary driving unit comprises a prime mover here shown as a constant-speed or variable-speed electric motor 8 which transmits motion to a belt-and-pulley drive 8a. The latter drives a first change-speed gear 9 which meshes with a second change-speed gear 10 provided on an output shaft 11a. If the motor 8 is of the constant-speed type, the r.p.m. of the shaft 11a may be varied by exchanging the gears 9, 10 with a set of different change-speed gears or by utilizing a variable-speed belt and pulley drive. The output shaft 11a is located outside of the circle defined by the left-hand end portions of the work spindles 7 so that it cannot interfere with movements of the stock 45 and/or work spindles 7 while the carrier T is being indexed to a different angular position and while the stock 45 is being introduced into the rear ends of the work spindles.

The planet pinion 5 may be coupled with or uncoupled from the work spindle 7 by means of a disk clutch 37 which comprises an axially reciprocable clutching sleeve 38a. When moved in one axial direction, the sleeve 38a can couple the planet pinion 5 to the work spindle 7; in response to movement in the other axial direction, the sleeve 38a allows the spindle 7 to rotate with reference to the pinion 5, i.e., the work spindle is then disconnected from the planetary transmission of the main driving unit. This work spindle further carries a driven gear 16a which is rigidly attached to its exposed left-hand end portion and may receive motion from a driver gear 52 rotatably mounted on an axially reciprocable intermediate shaft 54 which is parallel to the work spindle. The gear 52 can rotate on but cannot move axially with reference to the shaft 54, and the latter is journalled in its bearings 54a in such a way that it cannot rotate. The means for reciprocating the shaft 54 comprises a hydraulic or pneumatic cylinder-and-piston unit including a fixed cylinder 44a, a piston 56 and a piston rod 55 which is attached to the left-hand end of the shaft 54. The shaft 54 further carries a collar 57a constituting a stop for one end convolution of a resilient element here shown as a helical expansion spring 57 which bears against a synchronizing gear 53 rotatably mounted on the shaft 54. The gear 52 is in permanent mesh with a first intermediate gear 47 on the output shaft 11a, this intermediate gear 47 being adapted to be coupled to the shaft 11a by a first friction clutch 46 or to a synchronizing shaft 49 by a second friction clutch 48. The shaft 49 is coaxial with the output shaft 11a and carries a second intermediate gear 50 which is in permanent mesh with the synchronizing gear 53.

As stated before, the entire secondary driving unit is located outside of the circle formed by the work spindles 7. The radius of this circle corresponds to the distance between the axes of the main shaft 3 and a work spindle 7.

It is clear that the reciprocating unit including the cylinder 44a, piston 56 and piston rod 55 may be replaced by a mechanical or otherwise constructed reciprocating unit. For example, the reciprocating unit may comprise a rotary or otherwise movable cam whose cam face bears against the left-hand end of the intermediate shaft 54 and a spring which biases the shaft 54 axially against the cam face. The positioning of the gears 52, 53 on the intermediate shaft 54 is preferably such that the gear 53 can be moved into mesh with the planet pinion 5 before the driver gear 52 moves into mesh with the driven gear 16a of the work spindle 7. Also, the adjoining ends of teeth on the gears 16a, 52 and 5, 53 are pointed, as shown at 16b, 52a and 5a, 53a, to insure that the movement of gears 52, 53 into or out of mesh with the gears 16a, 5 is smooth, i.e., that these gears will not clash.

The operation of the bar machine is as follows:

When the carrier T is indexed to a new angular position, one of the work spindles (for example, the work spindle 7 which is shown in the drawings) comes to a halt in a position in which its gear 16a is adjacent to but axially spaced from the driver gear 52 on the intermediate shaft 54 of the secondary driving unit. The spindle 7 rotates because the disk clutch 37 is operative and couples it to the planet pinion 5 which is in permanent mesh with the sun wheel 5 on the main shaft 3. The clutching sleeve 38a is then shifted axially of the spindle 7 to disconnect the spindle from the pinion 5 whereby the latter continues to rotate at the speed determined by the sun wheel 4. The spindle 7 can rotate by inertia but is not positively driven as soon as the clutch 37 is disconnected.

In the next step, the intermediate shaft 54 is moved axially by hydraulic or pneumatic pressure fluid which is admitted into the left-hand chamber of the cylinder 44a so that the piston rod 55 travels in a direction to the right and causes the collar 57a to compress the spring 57 whereby the latter moves the teeth of the synchronizing gear 53 into mesh with the teeth of the planet pinion 5. At the same time, the friction cluch 46 is disconnected and the friction clutch 48 is applied so that the first intermediate gear 47 rotates at the speed of the second intermediate gear 50 as soon as the synchronizing gear 53 begins to mesh with the planet pinion 5. It is to be recalled that the gears 50, 53 are in permanent mesh and that the pinion 5 is in permanent mesh with the sun wheel 4. Motion from the sun wheel 4 to the driver gear 52 is transmitted via planet pinion 5, synchronizing gear 53, intermediate gear 50, shaft 49, friction clutch 48, and intermediate gear 47. At such time, the gear 52 is still out of mesh with the gear 16a of the spindle 7. However, the shaft 54 continues to move axially in response to admission of pressure fluid into the left-hand chamber of the cylinder 44a so that the gear 52 ultimately meshes with the gear 16a and begins to drive the spindle 7 at a speed determined by the aforementioned gear and clutch train between the sun wheel 4 and intermediate gear 47.

In the next step, the friction clutch 48 is disconnected and the clutch 46 is caused to couple the intermediate gear 47 with the output shaft 11a so that the latter drives the spindle 7 at the speed which is determined solely by the motor 8, by the ratio of the belt drive 8a, by the ratio of change-speed gears 9, 10 and by the ratio of the gear train 47, 52, 16a. The speed determined by the secondary driving unit may be higher or lower than the speed determined by the planetary transmission 4, 5. The change in speed of the spindle 7 at the time the clutch 46 couples the output shaft 11a with the intermediate gear 47 takes place without subjecting the rotary parts to excessive stresses because the spindle 7 is already in motion and is either accelerated or decelerated, depending on the intended purpose of the secondary driving unit. Furthermore, axial movements of the gears 52, 53 into mesh with the gears 16a, 5 take place without clashing because the teeth of these gears are pointed as described hereinabove. In fact, the synchronizing gear 53 is normally still in a state of rotary motion when it is caused to mesh with the pinion 5 because the intervals required for indexing of the carrier T are normally very short so that the gear 53 rotates by inertia subsequent to disengagement from the pinion 5 of the preceding work spindle. The spring 57 also contributes to smooth engagement between the teeth of the gears 5 and 53. The cylinder-and-piston unit which reciprocates the shaft 54 acts not unlike a shock absorber and contributes to smooth engagement between the teeth of the gears 52 and 16a.

In order to disengage the secondary driving unit from the work spindle 7, the aforedescribed steps are repeated in reverse i.e., the clutch 46 is disconnected so that the gear 47 can rotate with reference to the output shaft 11a, and the shaft 54 is shifted axially by admitting fluid into the right-hand chamber of the cylinder 44a to disengage the gear 53 from the pinion 5 and to thereupon disengage the gear 52 from the gear 16a. The carrier T is then indexed to the next angular position and moves the next work spindle 7 to a position in which this next spindle can be coupled to the secondary driving unit.

It is clear that the machine of my invention may be provided with two or even more secondary driving units each of which can drive a work spindle during an interval between consecutive indexing movements of the carrier T. All such secondary driving units will be installed outside of the circle defined by the spindles 7 and the workpieces 45.

A very important advantage of the improved secondary driving unit is that this unit can be coupled to work spindles whose end portions are obstructed or otherwise inaccessible. Of course, this driving unit is equally useful in machines wherein one end of each work spindle is readily accessible, i.e., the secondary driving unit of my present invention may be used in multiple-spindle machines of the type disclosed in my copending application Ser. No. 384,196. It is even more versatile because it can be used for transmitting rotary motion to spindles whose ends are free or obstructed. The construction of the secondary driving unit is very simple, and this unit occupies very little room so that it can be readily combined with or installed in existing multiple-spindle bar machines and analogous multiple-spindle machine tools. Also, the transmission of motion from the secondary driving unit to a work spindle will take place without any danger of clashing between intermeshing teeth or other damage to the motion transmitting parts. Save for the addition of a gear 16a on each work spindle 7, all other components of the multiple-spindle machine may remain unchanged. The operation of the secondary driving unit may be controlled in a fully automatic way by resorting to known programming devices including limit switches, valves, cams, photoelectric cells and/or others. The mounting of gears 52, 53 on a common shaft 54 also contributes to greater compactness of the secondary driving unit.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a multiple-spindle machine tool, a carrier indexible about a fixed axis; an annulus of spindles rotatably mounted in and having end portions extending beyond said carrier, each of said spindles comprising a driven gear; and an auxiliary driving unit outwardly adjacent to the circle described by the end portions of said spindles and arranged to drive one of said spindles during intervals between indexing movements of said carrier, said driving unit comprising a driver gear movable axially into and out of mesh with one of said driven gears during each interval between indexing movements of said carrier whereby said driver gear can transmit motion to the respective spindle, a prime mover, an intermediate gear adapted to be driven by said prime mover and being in permanent mesh with said driver gear, an intermediate shaft rotatably supporting said driver gear, and reciprocating means for moving said intermediate shaft axially so as to move said driver gear into and out of mesh with a driven gear.

2. A structure as set forth in claim 1, wherein said reciprocating means comprises a fluid-operated cylinder-and-piston unit.

3. A structure as set forth in claim 1, wherein said reciprocating means comprises a movable cam having a cam face engaging said intermediate shaft.

4. In a multiple-spindle machine tool, a carrier indexible about a fixed axis; an annulus of spindles rotatably mounted in and having end portions extending beyond said carrier, each of said spindles comprising a driven gear coaxially secured thereto; a main driving unit including driven pinions each coaxially mounted on one of said spindles, each of said spindles further comprising first clutch means for establishing a driving connection between such pinions and the respective spindles; and an auxiliary driving unit outwardly adjacent to the circle described by the end portions of said spindles and arranged to drive one of said spindles during intervals between indexing movements of said carrier, said auxiliary driving unit comprising an intermediate shaft, a driver gear mounted on said intermediate shaft and movable into and out of mesh with one of said driven gears in response to reciprocation of said intermediate shaft, a prime mover, an output shaft driven by said prime mover, an intermediate gear mounted on said output shaft and meshing with said driver gear, second clutch means for selectively coupling said intermediate gear with said output shaft, and synchronizing means for transmitting motion from one of said pinions to said intermediate gear when said first and second clutch means are idle.

5. A structure as set forth in claim 4, wherein said synchronizing means comprises a synchronizing gear mounted on said intermediate shaft and movable into and out of mesh with one of said pinions in response to reciprocation of said intermediate shaft, a second intermediate gear meshing with said synchronizing gear, and third clutch means for selectively coupling said first named intermediate gear with said second intermediate gear.

6. A structure as set forth in claim 5, wherein said auxiliary driving unit further comprises resilient means for biasing said synchronizing gear into mesh with one of said pinions in response to axial displacement of said intermediate shaft.

7. A structure as set forth in claim 5, wherein the mounting of said driver gear and said synchronizing gear on said intermediate shaft is such that said synchronizing gear is moved into or out of mesh with one of said pinions before said driver gear moves into or out of mesh with the corresponding driven gear.

8. A structure as set forth in claim 7, wherein said driver gear and said synchronizing gear are rotatable with reference to said intermediate shaft and said intermediate shaft is parallel to said spindles.

9. A structure as set forth in claim 5, wherein said synchronizing gear and said pinions have teeth provided with pointed end portions which engage each other when said synchronizing gear is moved into mesh with one of said pinions to thus prevent clashing of such teeth.

References Cited

UNITED STATES PATENTS

| 2,876,527 | 3/1959 | Matlachowsky | 82—29 XR |
| 3,081,523 | 3/1963 | Retz | 82—28 |

LEONIDAS VLACHOS, *Primary Examiner.*